July 3, 1923.
C. MOSS
1,460,822
ANTISLIPPING ATTACHMENT FOR VEHICLE WHEELS
Filed March 5, 1920
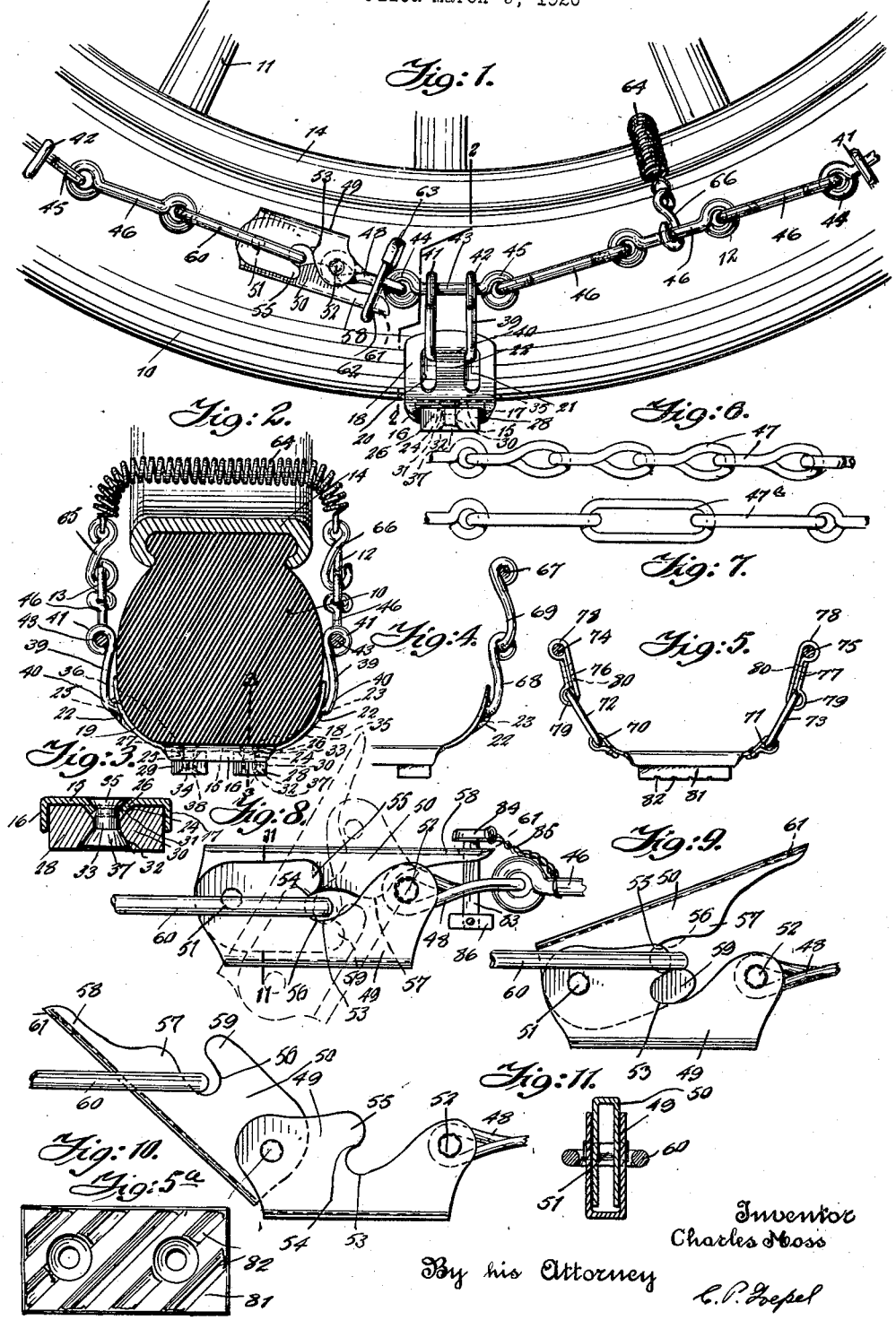
Inventor
Charles Moss
By his Attorney Patented July 3, 1923.

1,460,822

UNITED STATES PATENT OFFICE.

CHARLES MOSS, OF NEW YORK, N. Y.

ANTISLIPPING ATTACHMENT FOR VEHICLE WHEELS.

Application filed March 5, 1920. Serial No. 363,471.

*To all whom it may concern:*

Be it known that I, CHARLES MOSS, a citizen of the United States, and a resident of the city of New York, county and State of New York, have invented certain new and useful Improvements in Antislipping Attachments for Vehicle Wheels, of which the following is a description.

The present invention relates to improvements in anti-slipping attachments for vehicle wheels, and particularly such attachments adapted to be engaged with the tread of solid or pneumatic tires of automobile wheels.

An object of the invention is to provide in such an attachment ground engaging means which will engage the ground in a manner to effectually prevent skidding or slipping without injury or excessive wear to the tire structure, and without injury to the street. To this end I propose to provide in the present embodiment of the invention, a flat ground engaging surface and a flat tire engaging surface free from any obstruction which might injure the tire structure, and adapted, under compression, to exert an evenly distributed force upon the tire, such as would be encountered by the tire in direct engagement with a smooth road surface.

A further object of the invention is to provide a device which lends itself to present methods of manufacture, so that the same may be produced expeditiously in large quantities, with a high degree of accuracy and uniformity, and at relatively small cost.

It is a still further object to provide an improved tightening and connection means which may be locked in closed position, and which may be operated with facility, and will remain positively in closed position during use without danger of accidental opening due to shocks or jars from the road.

I further propose to provide novel means for maintaining the device upon the tire in a snug manner, so that there will be no looseness or rattling. With these and other objects in view, embodiments of my invention are shown in the accompanying drawings, and these embodiments will be hereinafter more fully set forth and eventually pointed out in the claims.

In the accompanying drawings:

Figure 1 is a side elevation of a section of an automobile wheel showing a portion of the attachment according to the present embodiment of my invention in place thereon.

Figure 2 is a transverse sectional view taken along the line 2—2 of Figure 1;

Figure 3 is a cross sectional view taken along the line 3—3 of Figure 2;

Figure 4 is a fragmentary view of a slightly modified form of ground engaging tread member.

Figure 5 is a side view of a further modified form of ground engaging tread member.

Figure 5$^a$ is a plan view of the tread member shown in Figure 5.

Figures 6 and 7 are views in elavation of modified forms of chains connectiong the several ground engaging members;

Figure 8 is an enlarged detail side elevation of the tightening connection member, and showing the same in closed position;

Figure 9 is a similar view showing the same partially open;

Figure 10 is a view showing the same completely open:

Figure 11 is a sectional view taken along the line 11—11 of Figure 8.

Similar reference characters indicate corresponding parts throughout the several figures of the drawing.

Referring to the drawings, the tire 10 of the wheel 11 is provided in circumferentially spaced relation, with a plurality of interconnected ground engaging anti-slipping tread members, these being connected by circumferential chains 12 and 13 at each side of the tire, the chains being disposed between the tread of the tire and the felly 14 of the wheel.

The anti-slipping devices are preferably formed of sheet metal stamped to shape and comprising an intermediate flat portion 15 adapted to engage the tread of the tire and provided with side flanges 16 and 17 bent outwardly therefrom forming a channeled or recessed outer surface. The end portions are curved about the sides of the tire, as at 18 and 19, and are each provided with pairs of parallel slots 20 and 21, the metal between the slots being bent outwardly, as at 22, into curved relation to the outer surfaces, and providing beneath the said bent out portion, pockets or spaces 23.

A pair of spaced apertures 24 and 25 are formed in the intermediate portion 15, and the metal immediately surrounding the same annularly is forced outwardly, as at 26 and 27 to form an annular recess on the inner tire engaging side and struck up apertured bosses on the outer side.

A pair of block members 28 and 29 of rectangular shape, having flat upper and lower surfaces, are provided with apertures 30 extending therethrough, reamed at each end, as at 31 and 32, and are engaged upon the portion 15 between the flanges 16 and 17, the bosses thereon engaging the reamed portion 31 to position the same. Rivets 33 and 34 are engaged through the apertures 24 and 25 of the portion 15, and the apertures 30 of the block members, their heads 35 and 36 at one end seating and being counter-sunk in the recesses 26 and 27, while the other ends are enlarged by suitable methods, the enlarged parts 37 and 38 engaging and being counter-sunk in the reamed portion 32. The two block members are spaced from each other, forming two points of support, and both engaging flatly upon the ground, so that a surface is provided which will substantially support the tire, will not injure the street, and will, at the same time, effectually resist slipping or skidding.

U-shaped link members 39 are provided at the ends of the tread members, the end portions being passed through slots 20 and 21, the transverse intermediate portion being bent into offset relation to the end portion, as at 40, and seating in the pockets 23. Thus the link members do not form an obstruction upon the inner side of the tread member, and lie snugly against the side of the tire at their ends. The ends of the link members are provided with eyelets 41 and 42 engaged by a link member 43 straight at its intermediate portion, and provided at its ends with eyelets 44 and 45 engaged by the eyelets at the ends of similarly formed link members 46, constituting a circumferential chain at each side of the tire interconnecting the several tread members which are disposed in spaced relation entirely about the tire.

As indicated in Figures 6 and 7 other forms of links, as for instance, the twisted links 47, Figure 6, or the flat elongated links 47ª, Figure 7, may be provided between the tread members. The connection of the chains disclosed, with the tread members is such that free turning movement of the chain is permitted, and kinking of the chain is prevented, so that the same is always in condition to be immediately placed upon the tire without having to untangle or laboriously arrange the parts in proper position as they of themselves, will assume this position.

At one end of each of the chains at each side of the tire there is provided a tightening and connection device connected to the eyelet 44 of the link 43 by a twisted link 48, and comprising a channeled member 49 of sheet metal bent upon itself and an opposed channel member 50 also formed of sheet metal bent upon itself and adapted to fit in the member 49 and pivotally connected thereto by a pin 51, the member 49 being provided with a pin 52 passing through the link 48 connecting the device thereto. The side portions of the member 49 are each provided with a pocket 53 inclined from the edges of said sides away from the link 48, the portion 54 at one side of the pocket being in the form of a hook 55. The member 50 is provided with a cut-out 56 in each of its sides extending toward the pin 51 and having its base substantially registering with a portion of the pocket 53, its edge being curved across the pocket 53 in the closed position of the device to close the pocket, an enlarged portion 57 being disposed at the side of the pin 52, the end of the member 50 extending over and away from the said pin to form a lever handle portion 58. A lifting finger portion 59 of the member 50 extends along and slightly beyond the spaced portion of the pocket 53 of the member 49.

At the other ends of each of the chain members there is provided an elongated flat link 60 adapted to be lockingly engaged with the connection and tightening member. The operation of connecting the link at one end of the chain to the tightening and connection device at the other end consists in first placing the device in open position, as indicated in Figure 10, and hooking the link 60 over the member 50, so that it engages the cut-out 56, and thereupon the member is swung into closed position, the enlarged portion 57 retaining the link in place within the cut-out and forcing the same over the end of the hook portion 55, whereupon it drops into the pocket 53, in which position it is retained, it being only possible to remove the same by manual operation of the device. An aperture 61 is provided in the end of the lever handle portion 58, and in order to lock the device so that the attachment may not be removed by unauthorized persons, the keeper 62 of a lock 63 is passed through the link 48 of the chain, and the aperture 61 of the member 50, so that the said member may not be swung into open position. In order to open the tightening and connection device, the same is first pressed at one side of the cutouts 53 into the position indicated in Figure 8 in dotted lines, whereupon the pull of the chain will overcome the slight resistance of the hook portion 55 in this position and pull the portion 50 into open position.

In order to hold the attachment upon the tire tightly, and at the same time yieldably, so as to prevent rattling or looseness, there are provided at suitable intervals, helical springs 64 permanently connected to one of the chains by figure 8 shaped link members 65 and adapted to be placed transversely across the felly and hooked to the other chain by hooks 66. If desired the side chains may be made in two parts to be connected by hooks and eyes on the respective ends. This construction will facilitate the attachment to the wheel. These spring members are readily attached and detached, and when in place, will positively maintain their connection without danger of becoming accidentally disconnected. A piece of leather or other suitable protective material may, if desired, be placed beneath the springs to prevent injury to the felly.

In Figure 4 I have illustrated a slightly modified form of construction in which the side chains 67 are connected to the tread members by a pair of links 68 and 69, similar in construction to the U-shaped link 39 in the above-described form of construction, so that the side chains are at a point further removed from the tread surface of the tire.

In Figure 5 I have illustrated a further modification especially desirable for pneumatic tires, in which the tread member is provided at each end of the flat intermediate portion with eyelets or loops 70 and 71, having flat elongated links 72 and 73 connected thereto, and which are connected to the side chains 74 and 75 by link connections 76 and 77 formed of strips of metal bent upon themselves to form at each end, loops or eyelets 78 and 79, the end portions of the strip being riveted, as at 80, to the intermediate portion. The forms of construction shown in Figures 4 and 5 render the side portions of the tread members of great flexibility, and by providing additional links, the same may be made to fit any size of tire.

A single tread block 81 is provided having diagonal corrugations 82. It will be understood that this form of tread block may be employed in the other forms, and that in all the forms, several, that is, two or more, tread blocks may be employed. These blocks may, if desired, in some cases, be made integral with the tire engaging portion. By making the tread blocks of greater depth the same may be used for traction members to be used in snow or upon muddy roads.

In Figure 8 I have illustrated a modified form of device to be used in place of the lock 63, and which comprises a pin 83 having a head 84 at one end connected by a chain 85 to the link 46, and provided at its other end with a pivoted piece 86 adapted to be turned into transverse retaining position.

I have illustrated and described preferred and satisfactory embodiments of my invention, but it is believed that changes may be made therein within the spirit and scope thereof, as defined in the appended claims.

I claim:

1. In a device of the character described, an anti-slipping attachment comprising a tire-engaging member provided along its longitudinal edges with outwardly bent flanges, said member having apertures therein, and being pressed outwardly about said apertures to form recesses on the inner face of said tire-engaging member, and annuli on the outer face thereof, and tread means mounted upon said tire-engaging member between said flanges provided with apertures reamed at their ends and in alignment with said apertures of said tire-engaging member, the reamed portions at one end being engaged by said annuli and rivet members engaged through said apertures to secure said tread means to said tire-engaging member, the heads at one end of said rivet members being countersunk in said recesses on the inner side of said tire-engaging member, the heads at the other ends thereof being countersunk in said reamed portions at the exposed side of said tread means.

2. An anti skid element for vehicle wheels comprising a plate fitted transversely of the tire and having outwardly turned flanges at its transverse edges, spaced road engaging units fitted to the end portions of said plate and engaging said flanges and the base of the plate, said units and the base of the plate having interfitting parts, and means engaging through said interfitting parts to hold the units upon the plate.

3. An anti-skid element for vehicle wheels comprising a plate adapted to engage transversely across the tread of the tire and having outwardly projecting flanges at its transverse edges, a pair of substantially square road engaging units mounted in spaced apart relation at the end portions of said plate and engaging at the sides with said flanges, said units having substantially central openings with flared ends, said plate also having openings in registry with the openings in the units, portions of said plate adjacent the openings being pressed into the adjacent flaring ends of the units, and rivets set through the openings and expanded into the flared ends and behind the pressed out portions.

In testimony that I claim the foregoing as my invention, I have signed my name hereunder.

CHARLES MOSS.